United States Patent [19]

Malone et al.

[11] Patent Number: 5,256,436
[45] Date of Patent: Oct. 26, 1993

[54] READY TO SERVE FROZEN DESSERT FOR SOFT SERVE DISPENSING

[75] Inventors: Michael J. Malone; Joyce G. Sage, both of Houston, Tex.

[73] Assignee: The Coca-Cola Company, Atlanta, Ga.

[21] Appl. No.: 882,729

[22] Filed: May 14, 1992

[51] Int. Cl.$^5$ ............................................. A23G 9/02
[52] U.S. Cl. .................................. 426/565; 426/567; 426/583; 426/804
[58] Field of Search ............... 426/565, 566, 567, 41, 426/43, 583, 804

[56] References Cited

U.S. PATENT DOCUMENTS

| | | | |
|---|---|---|---|
| 4,110,476 | 8/1978 | Rhodes | 426/41 |
| 4,293,573 | 10/1981 | Bradley, Jr. et al. | 426/43 |
| 4,391,830 | 7/1983 | Gudnason et al. | 426/43 |
| 4,427,701 | 1/1984 | Morley | 426/36 |
| 4,430,349 | 2/1984 | Malone et al. | 426/34 |
| 4,452,824 | 6/1984 | Cole et al. | 426/565 |
| 4,518,581 | 5/1985 | Miyake et al. | 426/660 |
| 4,631,196 | 12/1986 | Zeller | 426/580 |
| 4,737,374 | 4/1988 | Huber et al. | 426/565 |
| 4,985,270 | 1/1991 | Singer et al. | 426/565 |
| 5,082,682 | 1/1992 | Peterson | 426/564 |
| 5,096,731 | 3/1992 | Singer et al. | 426/583 |
| 5,112,626 | 5/1992 | Huang et al. | 426/565 |

OTHER PUBLICATIONS

W. S. Arbuckle, *Ice Cream*, 3d ed., 1977 (AVI Publishing Co., Westport, Ct.), pp. 34–105, 323–330.

*Primary Examiner*—Jeanette Hunter
*Attorney, Agent, or Firm*—Kenyon & Kenyon

[57] ABSTRACT

A soft serve frozen dessert, e.g., yogurt, capable of being hard packed and dispensed from an accordion-type cartridge is disclosed. The frozen dessert composition is formed with at least about 0.1 weight percent lecithin, at least about 0.15 weight percent pectin, at least about 0.1 weight percent xanthan gum, at least about 0.12 weight percent albumin, about 0.66 weight percent lactic acid (10%), about 64 weight percent skim milk, about 0.60 weight percent cream, about 5 weight percent nonfat dry milk, about 2 weight percent reduced lactose nonfat dry milk, about 8.5 weight percent corn syrup solids, about 16.5 weight percent high fructose corn syrup, and about 0.4 weight percent flavors.

8 Claims, No Drawings

READY TO SERVE FROZEN DESSERT FOR SOFT SERVE DISPENSING

FIELD OF THE INVENTION

This invention relates to frozen dessert compositions, and more particularly to ready to serve frozen dessert compositions for soft serve dispensing.

BACKGROUND OF THE INVENTION

Frozen dessert compositions are known in the art. Frozen dessert compositions prepared in a traditional freezer/dispenser machine are introduced into the machine in the form of a mix. This mix is frozen to a semi-solid consistency and held in this condition until dispensed into cones or bowls to fill the consumer's order. When these desserts are dispensed, about 60% of the aqueous phase of the mix is frozen into ice. The ice that has formed exists as small crystals which do not grow to an undesirable size due to the relatively short duration in the dispenser and the constant scraping of a dasher on the freezing surface of the barrel in the freezer/dispenser. During freezing, air is incorporated into the semi-frozen mass to increase the volume of the original mix by about 30%. This expansion of volume is known as overrun.

Desserts prepared at the retail site use expensive freezer/dispenser equipment which requires not only substantial initial capital investment, but also extensive daily cleaning and maintenance. Daily cleaning of the equipment must be supported by skilled operators with sufficient facilities to disassemble the freezer and its dasher, clean and dry the numerous parts, and reassemble the freezer. High cost and maintenance requirements have thus relegated the availability of soft serve frozen desserts to specialty stores and fast food stores which have the capital and facilities to service the equipment.

Recently, dispensing machines such as one sold under the trade name "Supa Nova" by SaniServ, Indianapolis, Id., have been developed which dispense factory frozen desserts via compression of a disposable collapsible cartridge. The factory frozen dessert is "hard packed" at a central factory, hardened and distributed to consumers, ready-to-serve through frozen distribution channels. Such equipment reduces capital costs because it reduces refrigeration and simplifies the internal workings of the frozen dessert machine. Daily maintenance is reduced to cleaning of the dispensing nozzle which requires only a small sink or large bowl of cleaning solution. This system, with its simplicity as compared to machines required for the semi-solid mix forms of desserts, allows the sale of frozen desserts in outlets such as convenience stores or at salad bars in traditional restaurants.

One drawback to the collapsible cartridge system is in the sensory properties of the frozen dessert dispensed from collapsible cassettes. The "hard packed" frozen desserts needed to fill the collapsible cassettes are similar to standard ready-to-serve frozen desserts in that they are frozen in a central factory, hardened and delivered through a frozen distribution system used for ice cream. These "hard packed" desserts have about 90 to 100% of the aqueous phase in the form of ice. To prevent ice crystals from growing during frozen storage, high levels of stabilizing hydrocolloid are typically employed. These stabilizers increase the viscosity of the mix, which gives the product a desirable mouth coating effect. The lack of a liquid aqueous phase produces a somewhat dull surface appearance, rather than the sheen or wet appearance characteristic of soft serve frozen desserts.

The "hard packed" frozen desserts also differ from the soft serve desserts in that they tear or pull in a sticky mass resembling uncooked dough when spooned, unlike the soft serve products, which when cut leave a smooth, glossy surface.

The heaviness of the mouthfeel of the "hard packed" frozen desserts can be overcome to some extent by increasing the overrun to approximately 75% to 100%, thus diluting the concentration of mix in the finished product volume. Diluting the concentration produces a dessert which more closely resembles the melting, light body of soft serve frozen desserts, but often undesirably leads to a fluffy texture characteristic of a mousse or whipped topping. Accordingly, there is a need for a hard packed frozen dessert dispensable from a collapsible cartridge which possesses desirable sensory properties.

OBJECTS AND SUMMARY OF THE INVENTION

In light of the foregoing, it is therefore an object of the invention to provide frozen dessert compositions having desirable sensory properties. It is a further object of this invention to provide a frozen dessert having properties such as good appearance (high sheen), smooth mouthfeel, good taste, and ease of cutting with a spoon without "tearing."

It is a further object of the present invention to provide ready to serve frozen yogurt compositions for soft serve dispensing having acceptable properties such as good appearance (high sheen), smooth mouthfeel, good taste, and ease of cutting with a spoon without "tearing."

It is a further object of the present invention to provide ready to serve frozen dessert compositions for soft serve dispensing having acceptable storage properties and which are capable of being hard packed.

These and other objects of the invention are accomplished by producing a frozen dessert composition including at least about 0.1 weight percent lecithin, at least about 0.15 weight percent pectin, at least about 0.1 weight percent xanthan gum, at least about 0.12 weight percent albumin, about 64 weight percent skim milk, about 0.60 weight percent cream, about 5 weight percent nonfat dry milk, about 2 weight percent reduced lactose nonfat dry milk, about 8.5 weight percent corn syrup solids, about 16.5 weight percent high fructose corn syrup, and about 0.4 weight percent flavors.

DESCRIPTION OF THE PREFERRED EMBODIMENTS

The frozen dessert compositions of the invention provide good appearance (high sheen), smooth mouthfeel, good taste, and ease of cutting with a spoon without "tearing." The compositions are capable of being hard packed at a central factory and of being dispensed in a collapsible cartridge container. The dessert compositions of the invention have at least about 0.1 weight percent lecithin, at least about 0.15 weight percent pectin, at least about 0.1 weight percent xanthan gum, at least about 0.12 weight percent albumin, about 64 weight percent skim milk, about 0.60 weight percent cream, about 5 weight percent nonfat dry milk, about 2 weight percent reduced lactose nonfat dry milk, about 8.5 weight percent corn syrup solids, about 16.5 weight percent high fructose corn syrup, and about 0.4 weight percent flavors.

The total solids content of the composition preferably is about 28 to 39%, with about 34.5% particularly preferred. The milk fat content preferably is about 0.1 to 0.5%, with about 0.25% particularly preferred. The milk solids nonfat content of the frozen dessert preferably is about 10 to 20%, with about 13.0% particularly preferred.

When the dessert composition is a yogurt, approximately about 0.6 weight percent lactic acid (10%) can also be included as a substitute for yogurt acid. When the dessert composition is a non-yogurt composition, it is preferred that no additional acid be added to the composition.

Albumin from egg white preferably is present in an amount of from about 0.12 to 1.2 weight percent, with about 0.72 weight percent particularly preferred. Dry egg white is approximately 80 weight percent albumin. Therefore, the preferred range of egg white is 0.15 to 1.5 weight percent, with about 0.90 weight percent particularly preferred.

It is preferred that the pectin used in compositions of the invention be casein reactive, in order to stabilize heavy milk used in the composition. While a variety of casein reactive pectins may be suitable with the invention, high methoxyl pectins are particularly preferred. A preferred pectin is one sold under the trade name "Hercules JMJ" by Hercules Corporation, Delaware.

The lecithin preferably is a soy lecithin, a lecithin sold under the trade name Actiflo 68 UB, from Central Soya, being particularly preferred.

The preferred composition ranges of lecithin, pectin and xanthan gum are about 0.1 to 0.3 weight percent lecithin, about 0.15 to 0.7 weight percent pectin, and about 0.1 to 0.5 weight percent xanthan gum. It has been found that a composition with less than about 0.1 weight percent lecithin, about 0.15 weight percent pectin, and about 0.1 weight percent xanthan gum exhibits undesirable properties such as decreased sheen, increased tearing, increased ice crystal formation, and increased popping during dispensing and air cell formation.

It has been found that usage of xanthan gum increases the sheen of the frozen dessert product, decreases the "tearing" of the product when cut with a spoon, and enhances control of the growth of ice crystals in the product during storage. It is believed that lecithin acts as a surfactant in the present composition to reduce the size of air cells in the frozen dessert product. Air cells in the frozen dessert product contribute to a popping sound when the product is dispensed and, if too large, give the product a mousse-like texture which is uncharacteristic of soft serve products. It is further believed that pectin contributes to the composition's desirable glossy sheen, and serves to prevent separation of the mix, particularly at the factory.

It has been found that increasing the lecithin, pectin and xanthan gum levels above about 0.3 weight percent lecithin, about 0.7 weight percent pectin, or about 0.5 weight percent xanthan gum, while not adversely affecting the properties of the composition, does not appear to significantly improve the properties of the frozen dessert. It is therefore preferred to maintain below about 0.3 weight percent lecithin, about 0.7 weight percent pectin, and about 0.5 weight percent xanthan gum in the composition.

The preferred corn syrup solids useful with the present invention are "regular conversion" corn syrup solids (38-48DE), with 36DE corn syrup solids particularly preferred. A particularly preferred high fructose corn syrup is high fructose corn syrup (71° B.) (42% fructose). Flavors useful in compositions of the invention can be chosen from any conventional flavors used in frozen dessert compositions, or any other suitable flavor.

Either whey albumin or egg whites may be used. It is believed that the albumin present in the composition of the invention, whether in the form of egg whites or whey albumin, contributes to the desirable smoothness of the frozen dessert product when cut with a spoon. Also, polysorbates can be used in place of lecithin and locust bean gum may also be used in place of xanthan gum. However, it is believed that guar gum, microcrystalline cellulose and carboxymethyl cellulose, which are gums typically used in frozen dessert compositions, are less effective with compositions of the invention than xanthan gum or locust bean gum.

A particularly preferred yogurt embodiment of the invention comprises the following ingredients in the stated weight percentages:

| Ingredient | Weight % |
| --- | --- |
| Lactic Acid (10%) | 0.66 |
| Skim milk | 64.29 |
| Cream | 0.60 |
| Nonfat dry milk | 5.09 |
| Reduced lactose nonfat dry milk | 2.00 |
| 36DE Corn syrup solids | 8.57 |
| High fructose corn syrup (71° B) | 16.53 |
| Pectin | 0.50 |
| Lecithin | 0.30 |
| Xanthan gum | 0.15 |
| Powdered egg white | 0.90 |
| Flavor | 0.40 |

The total solids content of this particularly preferred composition preferably is about 34.5%, the milk fat content preferably is about 0.25%, and the milk solids nonfat content of the frozen dessert preferably is about 13.0%. The milk fat content can be as high as about 2% in the event a lowfat composition is desired.

Compositions of the invention can be dispensed from a collapsible accordion-type frozen dessert dispenser, and can be "hard packed" at a central factory while possessing desirable properties such as good appearance (high sheen), smooth mouthfeel, good taste, and ease of cutting with a spoon without "tearing." By varying the milk fat content and the milk solids nonfat content, the dessert compositions of the invention may comprise yogurt, ice cream, ice milk, or any other frozen dessert product. It is particularly preferred to utilize compositions of the invention to make soft serve frozen yogurts.

A mix of a composition of the invention is prepared as follows. A blend tank is filled with milk, cream, high fructose corn syrup and most of the skim milk to be included in the product. The dry ingredients, such as corn syrup solids, nonfat dry milk, pectin, dry egg whites, and xanthan gum, are mixed into the liquid in such a manner to ensure that the dry materials are substantially fully hydrated without lumping. Lecithin preferably is then added to the mix, and the balance of skim milk not previously included is added to achieve the final mix volume.

The above mixture is warmed, preferably to a temperature of about 130° to 140° F., and homogenized. Homogenization preferably occurs in a two-stage homogenizer, with a pressure of about 2500 psig in the first stage and a pressure of about 500 psig in the second stage preferred. The homogenized mix is then pasteurized according to FDA requirements of 175° F. for 25 seconds or 150° F. for 30 minutes. The mix preferably is then cooled to less than about 40° F., and then held for at least several hours until ready for freezing. The preferred holding time is about 12 to 15 hours.

When the dessert composition is a yogurt composition, the yogurt is preferably prepared as follows. Skim milk and nonfat dry milk are mixed to achieve a milk solids nonfat content of about 10 to 13 percent. This mixture is then pasteurized to at least about 161° F. for at least about 15 seconds. The pasteurized mixture is pumped into a fermentation vessel and heated to about 185° F. for about 15 minutes and allowed to cool to about 115° F. The cooled mixture is inoculated with yogurt culture, preferably comprising *S. thermophilous* and *L. bulgaricus*. The inoculated mixture is held in a closed fermentation vessel until the lactic acid content of the mixture reaches about 1 weight percent. The yogurt is then broken by turning on an agitator in the vessel and cooled to a temperature below about 45° F. to stop the fermentation. The yogurt is held until needed for addition to the mix just prior to freezing.

The final yogurt product is obtained by pumping a mix prepared as described above into a flavor tank. Flavorings and yogurt are then preferably added to the mix in total quantities of about 0.2 to about 12 weight percent of the total product, and stirred until homogeneous. The flavored mix preferably is pumped through a continuous freezer. Alternatively, the flavored mix can be pumped to a batch freezer. The mix is rapidly frozen to a semifrozen state under continuous agitation to provide a product with about 80 to 150 percent overrun as it exits the freezer. The exit temperature of the semifrozen mix preferably is about 20° to 22° F.

The semifrozen mix can, if desired, be passed through a fruit feeder to incorporate fruit, candy, or other desired particulate matter. The particles added preferably average less than about ⅜ inch in diameter. The product is ready for packaging, such as in a collapsible container. The packaged product can be quickly hardened by blast freezing to a temperature of about −20° F.

The hardened product is distributed, such as in the normal channels for ice cream to a hard freezer (kept at less than about 0° F.) at the point of dispensing. The dispenser can remove the container from the hard freezer and place it in a tempering cabinet, maintained at about 13° to 15° F., about 24 hours prior to dispensing. The product is loaded into the dispenser and dispensed on demand.

It is to be understood that the claims appended hereto are intended to cover all changes and modifications of the disclosure herein which do not depart from the scope of the invention.

What is claimed is:

1. A frozen dessert composition comprising at least about 0.1 weight percent lecithin, at least about 0.15 weight percent pectin, at least about 0.1 weight percent xanthan gum, at least about 0.12 weight percent albumin, about 0.66 weight percent lactic acid, about 64 weight percent skim milk, about 0.60 weight percent cream, about 5 weight percent nonfat dry milk, about 2 weight percent reduced lactose nonfat dry milk, about 8.5 weight percent corn syrup solids, about 16.5 weight percent high fructose corn syrup, and about 0.4 weight percent flavors.

2. A composition according to claim 1 wherein said lecithin is present in an amount of from about 0.1 to 0.3 weight percent.

3. A composition according to claim 1 wherein said pectin is present in an amount of from about 0.15 to 0.7 weight percent.

4. A composition according to claim 3 wherein said pectin a casein reactive pectin.

5. A composition according to claim 1 wherein said xanthan gum is present in an amount of from about 0.2 to 0.5 weight percent.

6. A composition according to claim 1 wherein the total solids content preferably is about 28 to 39%, the milk fat content preferably is about 0.1 to 0.5%, and the milk solids nonfat content of the frozen dessert preferably is about 10 to 20%.

7. A hard packed, soft serve frozen dessert composition comprising about 0.66 weight percent lactic acid, about 64.29 weight percent skim milk, about 0.60 weight percent cream, about 5.09 weight percent nonfat dry milk, about 2.0 weight percent reduced lactose nonfat dry milk, about 8.57 weight percent 36DE corn syrup solids, about 16.53 weight percent high fructose corn syrup, about 0.50 weight percent pectin, about 0.30 weight percent lecithin, about 0.15 weight percent xanthan gum, about 0.90 weight percent powdered egg white, and about 0.40 weight percent flavor.

8. A composition according to claim 7 wherein the total solids content is about 34.5%, the milk fat content is about 0.25%, and the milk solids nonfat content of the frozen dessert is about 13.0%.

* * * * *